Dec. 10, 1940.        H. P. MILLER        2,224,229
ENGINE
Filed March 29, 1938      3 Sheets-Sheet 1
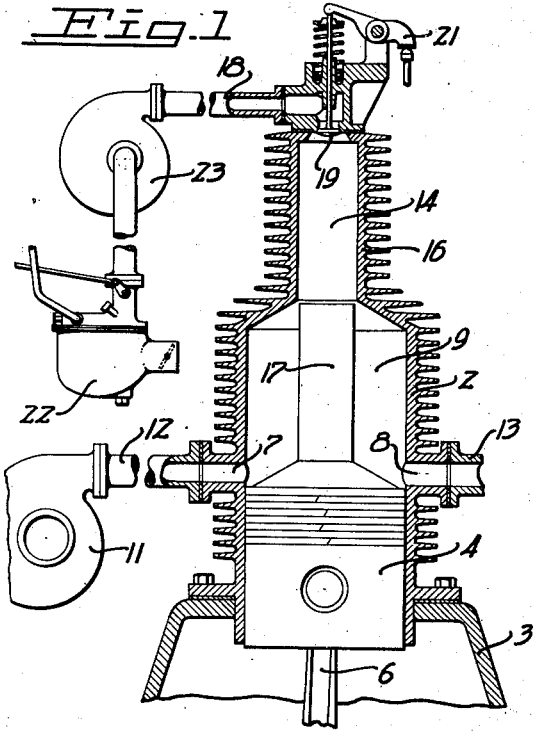
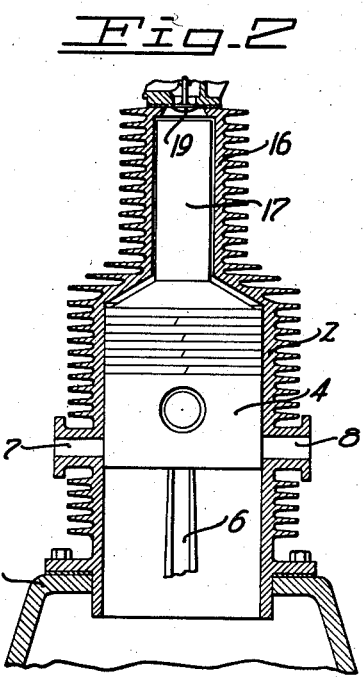
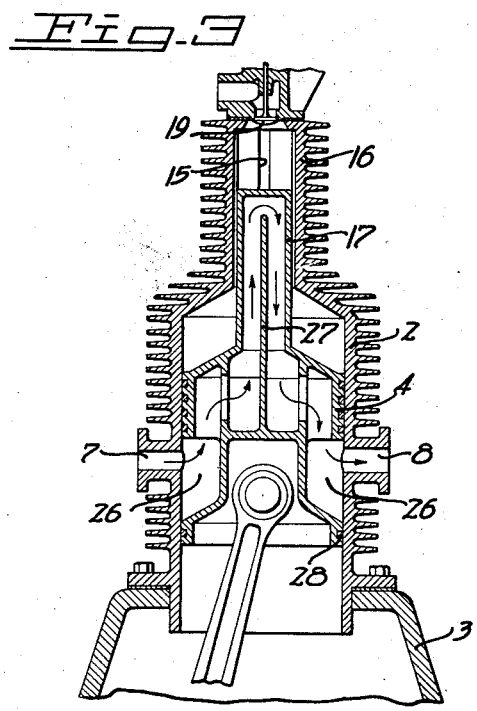
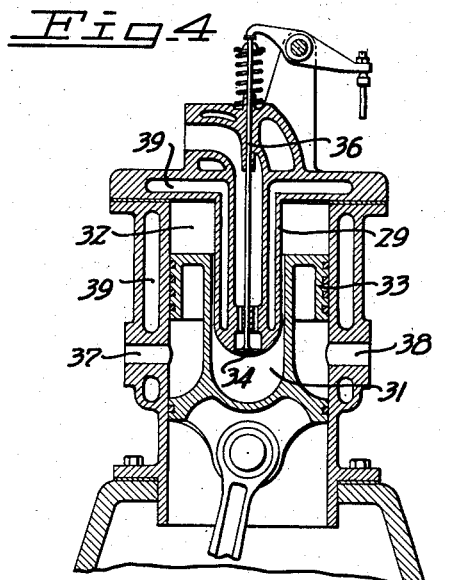
INVENTOR
HORACE P. MILLER
BY Charles D. Evans
HIS ATTORNEY

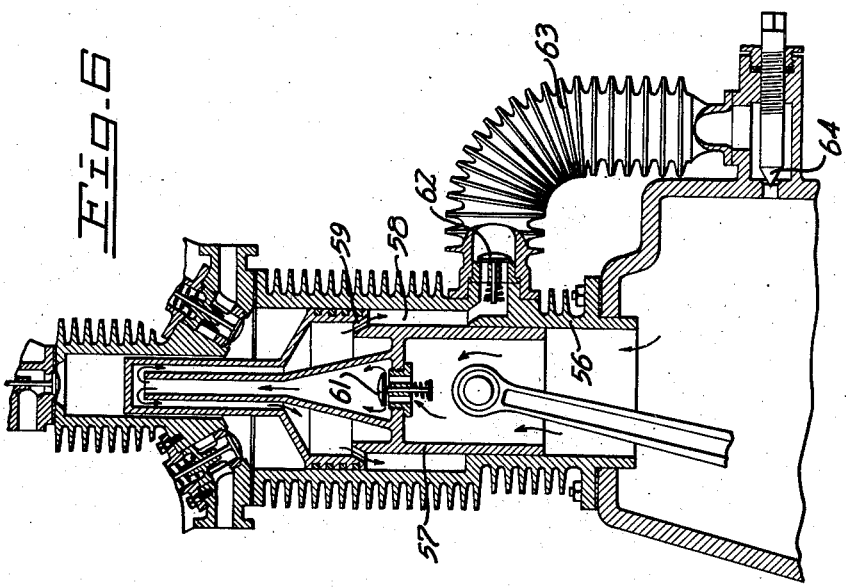

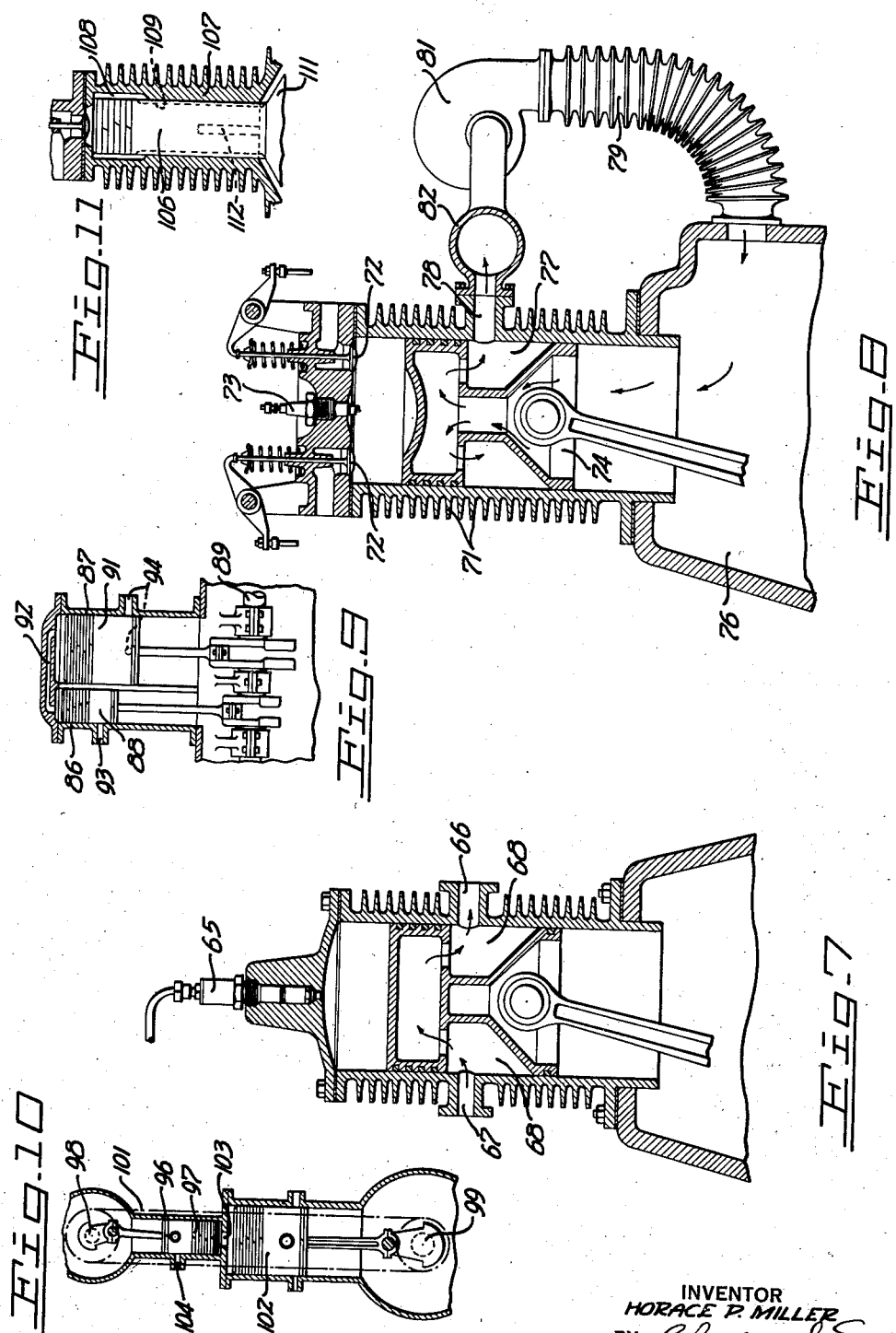

Patented Dec. 10, 1940

2,224,229

UNITED STATES PATENT OFFICE 2,224,229

ENGINE

Horace P. Miller, Oakland, Calif.

Application March 29, 1938, Serial No. 198,705

20 Claims. (Cl. 123—65)

My invention relates to internal combustion engines; and it is among the objects of my invention to provide a Diesel engine into which fuel is admitted at low pressure, thereby eliminating high pressure fuel pumps and injectors.

Another object of the invention is to provide a Diesel engine capable of high speeds, say over 2500 R. P. M.

A further object of the invention is to provide an improved air-cooling system for internal combustion engines and other machines having pistons and cylinders.

A still further object is to provide an engine having an air cooled piston, and in which the means for circulating air through the piston also serves to scavenge the cylinder.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 1 is a vertical sectional view of a two-cycle Diesel engine embodying the improvements of my invention; and Figure 2 is a similar view showing the piston at the top of its stroke.

Figure 3 is a vertical sectional view of a cylinder showing my improved system for air-cooling the piston; and Figure 4 is a similar view showing an introvert cylinder construction.

Figure 5 is a vertical sectional view of a cylinder and piston showing a modified cooling system, and also showing the adaption of the cylinder to a four-cycle Diesel engine.

Figure 6 is a vertical sectional view of a cylinder and piston showing a further modification of the cooling system.

Figure 7 is a vertical sectional view of a cylinder and piston showing the adaption of the cooling system to an ordinary injection type Diesel engine; and Figure 8 is a similar view showing the adaption of the cooling system to an ordinary spark ignition gasoline engine.

Figures 9 and 10 are vertical sectional views showing modified forms of Diesel engines embodying my invention.

Figure 11 is a vertical sectional view of a cylinder extension similar to that shown in Figures 1 and 2, and illustrates a further modification of the invention.

In terms of broad inclusion, the engine embodying my invention comprises a combustion cylinder; a semi-isolated fuel chamber connected with the cylinder; means for admitting fuel into the chamber; means for admitting air into the cylinder; a piston for compressing the air in the cylinder; and means for forcing the fuel from the chamber into the cylinder. In my improved Diesel engine the fuel admitted into the chamber is preferably a saturated mixture of fuel and air from an ordinary carburetor, and is fed into the fuel chamber when the pressure in the latter is substantially atmospheric. The fuel mixture is forced into the cylinder at the top of the piston stroke, and as the mixture passes into the cylinder combustion occurs due to high compression in accordance with the ordinary Diesel principle of fuel ignition.

The cooling system broadly comprises a hollow piston structure and a port in the side of the cylinder through which cooling air may be circulated through the piston. Means are provided for forcing circulation of air through the piston, and in a two-cycle Diesel this forced draft is also preferably employed for scavenging the cylinder. In four-cycle engines, or in two-cycle engines where the cooling air is not used for scavenging, the circulation is preferably directed in a closed circuit through the crank case, piston and an external duct. These cooling systems may be embodied in any ordinary Diesel or gasoline engine, as well as in my improved Diesel.

In greater detail, Figures 1 and 2 of the drawings show a two-cycle Diesel engine embodying the improvements of my invention. I use the term "Diesel engine" in its broader sense as including any engine in which the fuel is ignited by the heat of compression. My engine comprises a cylinder 2 mounted on a crank case 3 and having a piston 4 fastened to a connecting rod 6. Intake and exhaust ports 7 and 8 are provided in the sides of the cylinder to communicate with combustion chamber 9 when piston 4 is at the bottom of its stroke. A suitable pump or blower 11 is interposed in the inlet duct 12 to scavenge the cylinder and charge it with fresh air; and outlet port 8 connects with the exhaust pipe 13. If a plurality of cylinders are used the air may be supplied to each cylinder from a common intake manifold. Piston 4 functions to compress the air in the cylinder, as in ordinary Diesel operation.

A fuel chamber 14 is connected with the cylinder, and is preferably formed by a reduced extension 16 of the cylinder. This chamber is semi-isolated from the cylinder, preferably by a reduced extension 17 of the piston arranged to partially close the opening between the fuel chamber and cylinder. The piston extension has a diameter slightly smaller than the inside diameter of the cylinder extension to provide a small clearance therebetween. This clearance forms a narrow passage between the fuel chamber 14 and combustion chamber 9, but aside from this restricted passage the chambers are isolated from each other. Instead of providing a clearance between the piston and cylinder extensions, the piston extension may be more closely fitted and communication provided by grooves 15 in the side walls of the piston or cylinder extensions, as illustrated in Figure 3. These groove passages prevent the swirling of gases and tend to further effect isolation of the fuel chamber and cylinder.

Means are provided for introducing fuel into chamber 14 when the piston is at the bottom of its stroke and the pressure in the chambers is atmospheric. For this purpose a fuel duct 18 is connected with the top of the cylinder extension, and introduction of the fuel is controlled and timed by a valve 19 actuated by a cam shaft of the engine through suitable linkage 21. The fuel fed into chamber 14 is preferably a saturated mixture of fuel and air from a suitable carburetor 22. The fuel used is preferably fuel oil because of its greater heat value, but by employing lower compression ratios a more refined fuel, such as gasoline, may be used. A pressure carburetor may be employed, or an ordinary carburetor may be used in conjunction with a suitable pump or blower 23 to force the mixture into chamber 14. Since the pressure in the fuel chamber has been reduced to atmospheric when the mixture is introduced, the device 23 may be any simple low pressure pump or blower.

The carburetor provides means for regulating the mixture, in the usual manner, and if a plurality of cylinders are used the fuel may be supplied to each of the fuel chambers from a common intake manifold.

Means are provided for forcing the mixture from fuel chamber 14 into the cylinder. This is accomplished by the piston extension 17 as the latter moves upwardly into the fuel chamber during the compression stroke. Because the air in the combustion chamber 9 is being compressed simultaneously with the mixture in chamber 14, the fuel mixture remains in the semi-isolated chamber during the major portion of the compression stroke; there being insufficient differential in pressure to force the fuel down through the restricted passage at this time. However at the end of the compression stroke the mixture is forced into the cylinder by reason of piston extension 17 displacing substantially all of the contents of the fuel chamber. Figure 2 shows the piston at the top of the stroke, and shows the small clearance at the top of the piston extension as compared to the clearance above the working piston 4.

At this time, that is when the fuel mixture is forced into the combustion chamber, the air in the latter is compressed sufficiently to effect combustion in accordance with ordinary Diesel operation. The ratio of the initial volume of fuel chamber 14 to that of combustion chamber 9, preferably equals the ratio of a fully saturated fuel-air mixture to the additional air needed for complete combustion.

Because of the relatively small quantities of air in the saturated fuel mixture, there is insufficient oxygen to support combustion in fuel chamber 14 during compression, and explosion is therefore delayed until the fuel is forced into the cylinder where there is sufficient air to support combustion. During the down stroke the pressure will decrease more rapidly in fuel chamber 14 than in the working cylinder, due to combustion gases in the latter, thus causing the excess air to be forced up into the fuel chamber for also supporting combustion therein. The piston extension thus also operates as a power piston at this time. The entire bore thus serves for power production.

At the end of the power stroke ports 7 and 8 are uncovered for communication with the combustion chamber and the exhaust gases are discharged through port 8. At this time blower 11 operates to scavenge the cylinder and recharge it with fresh air. Fuel inlet valve 19 opens after the exhaust port has been uncovered long enough to reduce the pressure to atmospheric, and the cycle is again repeated.

By this improved mode of operation my Diesel engine permits introduction of fuel at low pressure from an ordinary carburetor. This not only eliminates the high pressure fuel pumps and injectors required in ordinary Diesels, but gives greater flexibility in performance since a carburetor provides simple and efficient means for introducing fuel in variable quantities depending upon the power desired. Another very important feature of my improved Diesel engine is that it is capable of high speeds, say over 2500 R. P. M. In an ordinary Diesel the metering and injection of fuel is a serious problem at high speeds. For example in an ordinary four cylinder four-cycle Diesel operating at 1100 R. P. M. and using two gallons of fuel per hour, there must be 132,000 injections per hour. The two gallons of fuel thus divided means that the fuel must be metered to inject 1⅕ ten thousandths of a pound of fuel 36.6 times per second. This is the situation at 1100 R. P. M., and it will readily be appreciated what the problem would be in the higher speed ranges, say over 2500 R. P. M. With my improved Diesel engine the higher speeds are achieved as readily as in an ordinary carburetor gasoline engine.

Figure 3 shows means for internally air cooling the piston, whereby a wholly air cooled engine is provided; it being understood however that the cylinder as shown in Figures 1 and 2 may be equipped with water jackets for ordinary water cooling if desired. In my improved air cooling system the piston 4 and its extension 17 are made hollow with recesses 26 at the sides of the piston for registering with cylinder ports 7 and 8 during a portion of the piston movement. The air from a blower, such as indicated at 11 in Figure 1, thus circulates through the hollow piston to cool it. A baffle plate 27 is preferably arranged in the piston to direct the cooling air up along the piston extension. An oil ring 28 is preferably disposed below the side openings 26 of the hollow piston to prevent oil from the crank case from entering the air passage and being blown out the exhaust. In this arrangement it will be observed that the scavenging blower serves the dual function of circulating cooling air through the piston and scavenging the cylinder.

Figure 4 shows an introvert cylinder construction embodying my invention. This engine operates the same as in Figures 1 and 2, but the cylinder extension 29 projects inwardly instead of outwardly, and therefore is a more compact arrangement. Actually the fuel chamber 31 in this case is in the piston, while the internal cylinder extension 29 projecting into the piston forms the means for forcing the fuel mixture into combustion chamber 32 above piston 33; this arrangement being in effect a reversal of the parts shown in Figures 1 and 2.

The fuel inlet valve 34 is mounted at the inner end of the cylinder extension, and is actuated by a stem 36 extending out through the cylinder head. Cooling air is preferably circulated through the hollow piston from a suitable blower through inlet and outlet ports 37 and 38, and the same blower also serves to scavenge the cylinder at the bottom of the stroke. Since this structure is more compact and has less heat radiating surfaces than in Figures 1 and 2, water jackets 39 may be found desirable to augment the air cooling.

Figure 5 shows my improvements embodied in a four-cycle Diesel engine. The structure here is similar to that in Figures 1 and 2, but has inlet and exhaust valves 41 and 42 mounted in the head of the cylinder. During the intake stroke inlet valve 41 opens and air is sucked into the cylinder. Fuel valve 43 also opens at this time and the fuel mixture is drawn into fuel chamber 44 from the carburetor. At the end of the following compression stroke the fuel mixture is forced into the cylinder and combustion occurs as described in the two-cycle operation. After the power stroke the piston comes up again and during this exhaust stroke valve 42 opens. Valves 41, 42 and 43 of course are all timed by a suitable cam shaft in the engine.

A modified cooling system is shown in this case, comprising a hollow piston having an opening 46 at its lower end communicating with the interior of crank case 47. The piston also has a side opening or recess 48 registering with a side port 49 in the cylinder wall; and an external duct 51 connects this port with the crank case to provide a closed path for air circulation through the crank case and hollow piston. This closed circuit is possible here because the port 49 does not serve to scavenge the cylinder.

Air is circulated by a suitable pump or blower 52 interposed in duct 51, and if several cylinders are used a manifold may be employed so that a single blower serves all the cylinders. A tube 53 is preferably provided in the hollow piston to direct the circulation up through the piston extension. Of course circulation in duct 51 may be in either direction. Since circulation is in a closed circuit, any oil entrained in the air is not lost but circulates back to the crank case. For this reason an oil ring is not necessary at the lower end of the piston.

Figure 6 shows another modification, incorporating a self contained pump in the cylinder and piston structure. The general arrangement is a four-cycle Diesel, the same as in Figure 5. The cylinder in this case has a reduced lower portion 56 in which a reduced portion 57 of the piston slides. This provides a pumping chamber 58 communicating with the interior of the piston through passages 59. A pump valve 61 is arranged in the piston to control the opening between piston and crank case, and a second pump valve 62 is arranged in the cylinder port, so that air is sucked through the piston and into the pumping chamber 58 when the piston goes up (as shown in Figure 6), and is forced out through the external duct 63 when the piston goes down. Another feature shown in this view is air expansion means comprising a needle valve 64 located at the point where the air discharges back into the crank case. The expansion at this point serves to further cool the air.

Figure 7 shows the cooling system of my invention embodied in an ordinary two-cycle Diesel engine having the usual fuel injector 65 and ports 66 and 67 for scavenging and introducing air. The piston however is made hollow with side openings or recesses 68 adapted to register with the ports during a portion of piston travel for circulating cooling air through the piston. A suitable pump or blower is provided for circulation, as in Figure 1. Of course when the piston is down the ports are opened to the cylinder for purpose of scavenging, in the usual manner.

Figure 8 shows the closed circuit cooling system embodied in an ordinary spark ignition gasoline engine. The cylinder has a straight bore as usual in automobile engines, but is unjacketed and has air cooling fins 71. The usual intake and exhaust valves 72 and spark plug 73 are provided in the head. The piston again is hollow with a bottom opening 74 communicating with crank case 76 and a side opening 77 registering with a cylinder port 78. The latter connects with the crank case through an external duct 79 containing a pump or blower 81. In a multi-cylinder engine all the cylinders are served by a single blower connected with a manifold 82.

While the form of engine shown in Figures 1 and 2 was chosen to illustrate the principles of operation of my improved Diesel engine, and also the cooling systems, it is to be understood that the engine may take other and perhaps preferred forms. The piston with an integral extension to force out the fuel is the simplest form of construction, and that is why it was used to describe the principles of my improved Diesel engine operation.

Figure 9 shows a modified form of Diesel engine embodying my invention, in which the fuel mixture is forced from the fuel chamber by a separate piston instead of by a piston extension. In this case the fuel chamber 86 is arranged alongside cylinder 87, and has a separate piston 88 connected to the main crank shaft 89 with which power piston 91 connects. Fuel chamber 86 is connected with the cylinder by a restricted passage 92, and the clearance above fuel piston 88 is less than that above power piston 91, so that the fuel mixture is forced over into the cylinder at or near the top of the stroke. The inlet port 93 of the fuel chamber is opened to admit fuel at the bottom of the stroke, and the air inlet and exhaust ports 94 of the cylinder are also controlled by the piston, so that the two-cycle Diesel shown is entirely valveless.

While this engine is more complicated by reason of its having a separate piston in the fuel chamber, it has the advantage of more accurate control of the time when the fuel charge is forced over into the cylinder. Thus by having the crank of fuel piston 88 lag behind that of the main piston 91, the latter will reach the top of its stroke before the fuel piston so that no differential pressures are developed during the major portion of the up stroke and there is no tendency whatever for the fuel charge to prematurely enter the cylinder. As the main piston passes top dead center the fuel piston is still going up, thus forcing over the fuel mixture. This lag in the piston movement thus provides means for accurately controlling the timing of the fuel entrance into the cylinder.

Figure 10 shows a further arrangement in which fuel chamber 96 is disposed above the cylinder. Fuel piston 97 is connected to a separate crank shaft 98 which in turn is connected to the main crank shaft 99 through a suitable chain or gear drive 101, so that movement of piston 97 is synchronized with the main power piston 102. Communication between the fuel chamber and cylinder is through a restricted port 103, and fuel is admitted into the fuel chamber through a side port 104. In this arrangement the crank of the fuel piston also preferably lags slightly behind the crank of the main piston to insure that the main piston reaches the top of its stroke before the fuel mixture is forced over into the cylinder. In this engine, as well as in that shown in Figure 9, the excess air in the cylinder flows over into the fuel chamber during combustion and causes combustion also to take place in the fuel chamber. Therefore during the back stroke the fuel piston also functions as a power piston.

No means for cooling is shown in these latter engines; it being understood that any type of cooling system may be employed. If desired the main pistons in both modifications may be made hollow for air cooling.

Figure 11 shows an engine of the general type illustrated in Figures 1 and 2, but provided with means for positively timing the flow of the mixture from the fuel chamber into the cylinder. This control is accomplished by slidably fitting the piston extension 106 in the cylinder extension 107, and providing the upper end with piston rings. The cylinder extension in this case is sufficiently long so that the ringed part of the piston lies in the extension during the full stroke.

Grooves 108 in the upper part of the cylinder extension walls register with grooves 109 in the sides of the piston extension at the top of the stroke, so that the mixture compressed in the fuel chamber flows down into the cylinder at or near the time when the main piston 111 is at the top of its stroke. This valve arrangement thus positively times the admission of fuel into the cylinder.

A groove 112 is also preferably provided in the lower portions of the cylinder extension for connecting the chamber with the cylinder at the bottom of the stroke to equalize the pressures at this time. Groove 112 is arranged to effect communication with the cylinder after the exhaust port for the latter has opened and the pressure reduced to atmospheric. A new charge of fuel mixture is introduced into the fuel chamber from a carburetor in the same manner as described in connection with Figures 1 and 2.

In the various structures shown in Figures 1, 9, 10 and 11 the general principle of operation is the same; namely, the fuel mixture is introduced at low pressure and then is compressed in a separate chamber to a pressure great enough to force it over into the main cylinder at the top of the piston stroke. In all cases the fuel chamber is semi-isolated from the cylinder, either by restricted communication or by valve controlled passages.

I claim:

1. An engine comprising a crank case, a cylinder mounted on the crank case, a hollow piston slidable in the cylinder and communicating with the crank case, said cylinder having a port communicating with the hollow piston, and a duct connecting said port with the crank case whereby air may be circulated in a circuitous path through the hollow piston, duct and crank case.

2. An engine comprising a crank case, a cylinder mounted on the crank case, a hollow piston slidable in the cylinder and communicating with the crank case, said cylinder having a port communicating with the hollow piston, a duct connecting said port with the crank case whereby air may be circulated in a circuitous path through the hollow piston, duct and crank case, and means for forcing circulation of air along said path.

3. An engine comprising a crank case, a cylinder mounted on the crank case, a hollow piston slidable in the cylinder and communicating with the crank case, said cylinder having a port communicating with the hollow piston, a duct connecting said port with the crank case whereby air may be circulated in a circuitous path through the hollow piston, duct and crank case, and means associated with the piston for forcing circulation of air along said path.

4. An engine comprising a crank case, a cylinder mounted on the crank case, a hollow piston slidable in the cylinder and communicating with the crank case, said cylinder having a port communicating with the hollow piston, a duct connecting said port with the crank case whereby air may be circulated in a circuitous path through the hollow piston, duct and crank case, means for forcing circulation of air along said path, and means in the path of circulation for expanding the air to cool it.

5. An engine comprising a cylinder, a fuel chamber connected with the cylinder, means for introducing air into the cylinder, a piston for compressing the air in the cylinder, means for introducing fuel into the chamber during a period of low pressure in the cylinder, and means comprising an extension on the piston for forcing the fuel from the chamber into the cylinder at the time of high compression in the latter.

6. An engine comprising a cylinder, a fuel chamber connected with the cylinder, means for introducing air into the cylinder, a piston for compressing the air in the cylinder, means for introducing fuel into the chamber during a period of low pressure in the cylinder, and a separate piston slidable in the fuel chamber to force fuel from the latter into the cylinder.

7. An engine comprising a cylinder, a fuel chamber connected with the cylinder, means for introducing air into the cylinder, a piston for compressing the air in the cylinder, means for introducing fuel into the chamber during a period of low pressure in the cylinder, and a separate piston slidable in the fuel chamber to force fuel from the latter into the cylinder, said piston in the cylinder reaching the top of its stroke before the piston in the fuel chamber.

8. An engine comprising a cylinder, a fuel chamber connected with the cylinder, means for introducing air into the cylinder, a piston for compressing the air in the cylinder, means for introducing fuel into the chamber during a period of low pressure in the cylinder, means for forcing the fuel from the chamber into the cylinder at the time of high compression in the latter, said piston being hollow and said cylinder having a port in its side wall communicating with the hollow piston during a portion of the piston movement and communicating with the combustion chamber of the cylinder at the bottom of the piston stroke, and means for circulating air through the hollow piston when the port is in register therewith and for circulating air through the combustion chamber when the port registers with said chamber.

9. An engine comprising a pair of communicating cylinders, means for introducing a component of a combustible mixture into one cylinder and another component into the other cylinder, pistons in the cylinders for compressing said components to effect an interchange of gases between the cylinders to form a combustible mixture, and means for synchronizing the pistons so that both move in power strokes during expansion of the burning gases.

10. An engine comprising a pair of communicating cylinders, means for introducing a component of a combustible mixture into one cylinder and another component into the other cylinder, pistons in the cylinders for compressing said components to effect an interchange of gases between the cylinders to form a combustible mixture, and means for synchronizing the pistons so that both move in power strokes during substantially the full period of expansion of the burning gases in said cylinders.

11. An engine comprising a pair of communicating cylinders, means for introducing a component of a combustible mixture into one cylinder and another component into the other cylinder, pistons in the cylinders for compressing said components to effect an interchange of gases between the cylinders to form a combustible mixture, and means for synchronizing the pistons so that both retract substantially simultaneously to operate as power pistons.

12. An engine comprising a pair of communicating cylinders, means for introducing a component of a combustible mixture into one cylinder and another component into the other cylinder, pistons in the cylinders for compressing said components to effect an interchange of gases between the cylinders to form a combustible mixture, said compression being sufficient to heat the gases to the kindling temperature of said mixture, and means for synchronizing the pistons so that both move in power strokes during expansion of the burning gases.

13. An engine comprising a pair of communicating cylinders, means for introducing a component of a combustible mixture into one cylinder and another component into the other cylinder, pistons in the cylinders for compressing said components to effect an interchange of gases between the cylinders to form a combustible mixture, and means for synchronizing the pistons so that both move outwardly in power strokes immediately following ignition of the mixture.

14. An engine comprising a pair of cylinders communicating through an open passage, means for introducing a component of a combustible mixture into one cylinder and another component into the other cylinder, pistons in the cylinders for compressing said components to effect an interchange of gases between the cylinders to form a combustible mixture, and means for synchronizing the pistons so that both move in power strokes during expansion of the burning gases.

15. An engine comprising a pair of communicating cylinders, means for introducing a component of a combustible mixture into one cylinder and another component into the other cylinder, pistons in the cylinders for compressing said components to effect an interchange of gases between the cylinders to form a combustible mixture, a shaft, and means connecting said pistons to the shaft and arranged so that both pistons transmit power to the shaft during expansion of the burning gases.

16. An engine comprising a pair of communicating cylinders, means for introducing fuel into one of the cylinders, means for introducing air into the other cylinder, pistons in the cylinders for compressing said components to effect an interchange of gases between the cylinders to form a combustible mixture, and means for synchronizing the pistons so that both move in power strokes during expansion of the burning gases.

17. An engine comprising a pair of communicating cylinders, means for introducing a rich charge of fuel into one of the cylinders, means for introducing into the other cylinder a charge of air proportioned to form a combustible mixture when combined with said fuel charge, pistons in the cylinders for compressing said components to effect an interchange of gases between the cylinders to form a combustible mixture, and means for synchronizing the pistons so that both move in power strokes during expansion of the burning gases.

18. An engine comprising a pair of communicating coaxial cylinders, means for introducing a component of a combustible mixture into one cylinder and another component into the other cylinder, and pistons in the cylinders for compressing said components to effect an interchange of gases between the cylinders to form a combustible mixture.

19. An engine comprising a cylinder, a hollow piston in the cylinder, and a port for passing cooling air through the hollow piston during the upper portions of its stroke and for admitting air into the cylinder at the bottom of the stroke.

20. An engine comprising a cylinder, a hollow piston in the cylinder, and intake and exhaust ports arranged to be uncovered by the piston to communicate with the cylinder at the bottom of the piston stroke and arranged to communicate with the hollow piston during the upper portions of its stroke and after said ports have been closed to the interior of the cylinder.

HORACE P. MILLER.